(12) United States Patent
Henke

(10) Patent No.: US 7,722,093 B2
(45) Date of Patent: May 25, 2010

(54) FITTING

(75) Inventor: Stefan Henke, Olpe (DE)

(73) Assignee: Yorkshire Fittings Ltd., Dusseldorf (DE)

( * ) Notice: Subject to any disclaimer, the term of this patent is extended or adjusted under 35 U.S.C. 154(b) by 0 days.

(21) Appl. No.: 11/570,496

(22) PCT Filed: Jun. 24, 2005

(86) PCT No.: PCT/EP2005/006842

§ 371 (c)(1),
(2), (4) Date: Feb. 6, 2007

(87) PCT Pub. No.: WO2006/000430

PCT Pub. Date: Jan. 5, 2006

(65) Prior Publication Data

US 2007/0236017 A1    Oct. 11, 2007

(30) Foreign Application Priority Data

Jun. 25, 2004   (DE) .................. 10 2004 031 045

(51) Int. Cl.
*F16L 21/02* (2006.01)
(52) U.S. Cl. ................... 285/374; 285/13
(58) Field of Classification Search ............. 285/382, 285/13, 14, 924, 374
See application file for complete search history.

(56) References Cited

U.S. PATENT DOCUMENTS

| | | | |
|---|---|---|---|
| 4,997,214 A * | 3/1991 | Reese | 285/382 |
| 5,007,667 A * | 4/1991 | Unewisse et al. | 285/382.2 |
| 5,484,174 A | 1/1996 | Gotoh et al. | |
| 6,581,983 B1 * | 6/2003 | Viegener | 285/382 |
| 6,726,256 B2 * | 4/2004 | Viegener | 285/382 |

FOREIGN PATENT DOCUMENTS

| | | |
|---|---|---|
| DE | 19844878 | 4/2000 |
| DE | 10164568 C1 | 6/2003 |
| DE | 10217824 C1 | 7/2003 |
| DE | 10236848 | 2/2004 |
| EP | 1486713 A1 | 12/2004 |

* cited by examiner

*Primary Examiner*—Aaron M Dunwoody
(74) *Attorney, Agent, or Firm*—Townsend and Townsend and Crew LLP

(57) ABSTRACT

The invention relates to a fitting for connecting lengths of pipe by compression, having a substantially cylindrical internal contour. The fitting has a ridge which is configured in a radially outward direction and in which a sealing element is provided. The fitting is slidable onto the lengths of pipe, the internal contour having a region of non-circular cross-section. The invention also relates to a connecting arrangement for connecting lengths of pipe by compression, comprising a length of pipe and a fitting plus a sealing element which is arranged in the ridge. One axial gap which extends over the entire connecting region is formed between the length of pipe and the internal contour of the fitting in the uncompressed state. Such an axial gap with an open end would ensure that a leak exists even in the region of the sealing element in an uncompressed state.

14 Claims, 4 Drawing Sheets

FITTING

CROSS REFERENCE TO RELATED APPLICATIONS

This application is a U.S. national phase of International Patent Application No. PCT/EP2005/006842, filed Jun. 24, 2005, entitled "FITTING", which claims priority to German Patent Application No. 10 2004 031 045.9, filed Jun. 25, 2004, entitled "FITTING".

BACKGROUND OF THE INVENTION

The invention relates to a fitting for connecting lengths of pipe or tube by compression, having a substantially cylindrical internal contour having at least one ridge which is configured in a radially outward direction and in which a sealing element is provided, the fitting being slidable onto the lengths of pipe or tube.

Fittings of the above kind are known per se. Such fittings comprise a connecting socket in which is formed, to receive a sealing element, an elevation radially shaped outwards into a ridge-like form in cross-section. The elevation serves to receive an end of a pipe or tube. To produce a compression connection, the connecting socket is cold-formed to the pipe or tube by means of a compression tool. In the compression, both the ridge-like elevation with the sealing element situated inside it and also the adjoining regions on both sides of the elevation are deformed almost simultaneously, thus producing a non-releasable, permanently sealed connection.

Following the installation of a piping or tubing system, the system is pressurised in a regulation manner. If a point of connection has accidentally not been compressed, this pressure test normally produces a detectable leak. However, if there are adverse pairings of the tolerances of the fitting, sealing element and pipe or tube, it may happen that when the pipe or tube is inserted in the connecting socket the sealing element is subjected to pressure between the fitting and pipe or tube in such a way that no visible leak occurs. Only in subsequent operation does the uncompressed connection become increasingly leaky due to variations in temperature and pressure, which may result in considerable structural damage, particularly where the system is buried.

DE 102 17 824 C1 discloses a pipe connection, comprising a fitting, which is provided at least with a sealing element, and a line pipe, the end region of which comes to bear against a shoulder of the fitting after it has been slid into or onto the fitting. The line pipe has at least one region extending in the longitudinal direction that differs from the ideal circular shape. After the line pipe is inserted into or slid onto the fitting, there is at least one leakage point between the sealing element and the fitting or between the sealing element and the line pipe, which is closed in a gastight or liquidtight manner after a compressing operation. However, the line pipe of this compression connection is complex to produce. In addition, it causes considerable storage and stockkeeping expenditure. Furthermore, when the line pipe is slid into or onto the fitting, the sealing element may be changed in its functional position, in particular the leakage point may be reduced in its dimensions during the rolling or rotating of the sealing element, whereby the desired effect is greatly jeopardised.

Known from DE 197 22 935 C1 is a compression connection in which there is provided a sealing element having a cross-section lying in the circumferential direction which is given a cross-section which differs, in the form of a projection, from the initial cross-section. This produces a leak in the uncompressed state, which is removed after compression. However, the sealing element of this compression connection is complicated and cost-intensive to manufacture. What is more, the desired effect may be greatly jeopardised if, when the pipe or tube is inserted in the connecting socket, the sealing element is rolled or rotated in such a way that the projection of the sealing element is no longer situated in the functional position intended for it.

DE 101 64 568 C1 discloses a pipe connection, comprising a metallic press fitting, which has at least one section which is intended for receiving a sealing element and is formed in a ridge-like manner in cross-section, and a metallic line pipe with a smoothly formed end region. The sealing element has an identical cross-section which differs from the ideal circular cross-section in all cross-sectional planes. The sealing element is dimensioned in such a way and adopts a position radially in relation to the annular ridge and the line pipe in such a way that there forms a gap, which allows the medium that is to be carried to pass through and is closed in a sealing manner after the compressing operation. The sealing element of this compression connection is likewise very complex and cost-intensive to produce. A deterioration of the desired effect as a result of rolling or rotating of the sealing element also cannot be ruled out.

In DE 100 07 914 C1 is described a fitting for making a compression connection to an inserted end of a pipe or tube, which fitting has an end portion on which is arranged an annular ridge in which a sealing ring is provided. Provided at the ridge is a bulge which sets a spacing between the sealing ring and the wall of the end portion. It is only by the compression of this unsealed point that a sealed connecting arrangement is produced. The bulge is produced by a punch which has for example a spherical portion. This makes the transition from the annular groove to the bulge relatively sharp-edged, which means that, depending on the pairing of tolerances, the sealing element does not flow into the bulge in the desired way and the user must take care to see in what position the compression tool is fitted to the connecting socket.

Known from DE 101 18 955 A1 is a pipe connection comprising a metal compression fitting which has a portion which is of a ridge-like form in cross-section and in which a sealing element is arranged. In the fitted but uncompressed state, the sealing element occupies a position radially with respect to the annular ridge and the pipe which, even allowing for production tolerances on the sealing element, compression fitting and pipe, is of a size such that it produces a gap which allows the medium being carried to pass through, which gap is closed with a seal after compression. Something that is disadvantageous about this compression connection is that only a very small tolerance range is available when the fitting, sealing element and pipes are being produced, which means that production is very complicated and cost-intensive. The possibility of using standard pipes is largely ruled out. What is more, the pipe comes to rest in the connecting socket with a relatively large amount of play, as a result of which the pipe may easily slip out of the connecting socket in the course of further installation prior to the compression. This creates a risk of mis-compression.

BRIEF SUMMARY OF THE INVENTION

The invention aims to remedy this. The object underlying the invention is to provide a fitting for connecting lengths of pipe or tube by compression and a connecting arrangement which provides guidance for the lengths of pipe or tube for fitting, which ensures that there is a leak in the fitted but uncompressed state, and which can, in addition, be produced inexpensively. In accordance with the invention, this object is achieved by virtue of the fact that the internal contour of the fitting has a region of non-circular cross-section at least one end.

The invention provides a fitting for connecting lengths of pipe or tube by compression which provides guidance for the length of pipe or tube for fitting, which ensures that there is a leak in the fitted but uncompressed state, and which can, in addition, be produced inexpensively.

It is preferable for at least one outwardly curved ridge to be arranged in a region of non-circular cross-section. This ensures that the leak continues to exist even in the region of the sealing element. The non-circular cross-section is advantageously of substantially oval or polygonal form.

In an embodiment of the invention, the non-circular cross-section is of a non-round shape which is symmetrically arranged around the circumference. As a result of this rotationally invariant formation of the cross-section, the length of pipe or tube is guided into the fitting in a centralised manner when it is being inserted therein.

In a refinement of the invention, a collar is arranged at each of the ends of the fitting. This optimises the guidance of the length of pipe or tube in the fitting. What is more, the frictional grip of the compression connection is maximised by the enlarged area of compression which is obtained in this way.

In an embodiment of the invention, the internal contour has at least one narrowing in diameter against which at least one length of pipe or tube can be brought into abutment. This ensures a minimum spacing between the two lengths of pipe or tube which are to be introduced into the fitting on both sides, thereby counteracting the possibility of the connection being sealed in the uncompressed state as a result of the lengths of pipe or tube which are to be connected resting against one another in an exact fit. The narrowing of diameter is advantageously produced all round; a narrowing of diameter at a point is also possible.

In a development of the invention, a notch is made in the outside of the fitting, thereby forming the narrowing of diameter in the internal contour of the fitting. This makes it possible for the narrowing of diameter to be produced inexpensively.

The object is also achieved by a connecting arrangement comprising at least one length of pipe or tube and a fitting plus a sealing element which is arranged between the two latter in a ridge in the fitting, in which the internal contour of the fitting is partly of a non-round form and at least one axial gap which extends over the entire connecting region is formed between the length of pipe or tube and the internal contour of the fitting in the uncompressed state.

The invention provides a connecting arrangement for connecting lengths of pipe or tube by compression which provides guidance for the length of pipe or tube for fitting, which ensures that there is a leak in the fitted but as yet uncompressed state, and which, in addition, enables the connection to be made inexpensively.

The gap formed between the length of pipe or tube and the internal contour of the fitting has in this case preferably a radial dimension of 0.1 to 2 mm.

BRIEF DESCRIPTION OF THE SEVERAL VIEWS OF THE DRAWINGS

Other refinements and arrangements of the invention are specified in the other subclaims. An exemplary embodiment of the invention is shown in the drawings and is described in detail below. In the drawings:

FIG. 1 shows the cross-section of a fitting having a length of pipe or tube slid in.

FIG. 2 shows the cross-section of a different design of fining having a length of pipe or tube slid in.

FIG. 3 shows the cross-section of a further design of fitting having a length of pipe or tube slid in.

DETAILED DESCRIPTION OF THE INVENTION

Figure 1:
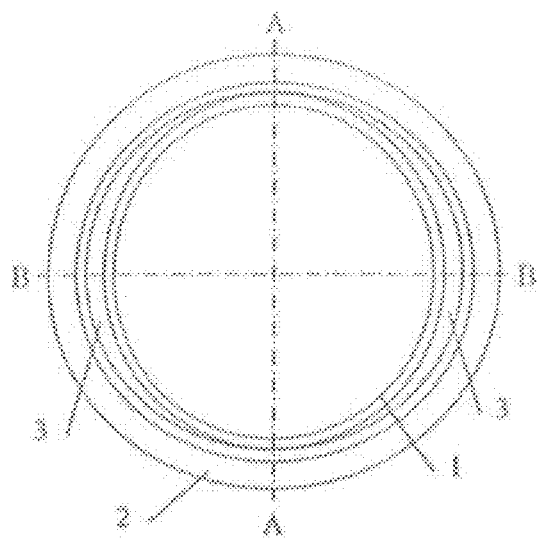
Figure 2:
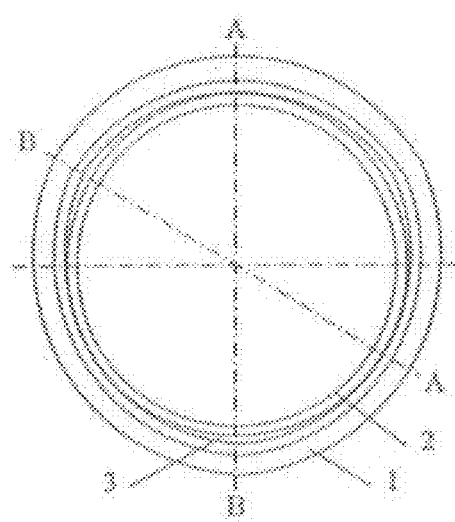
Figure 3:
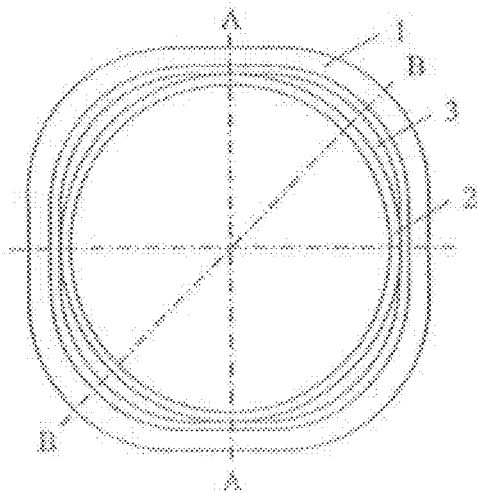
Figure 4:
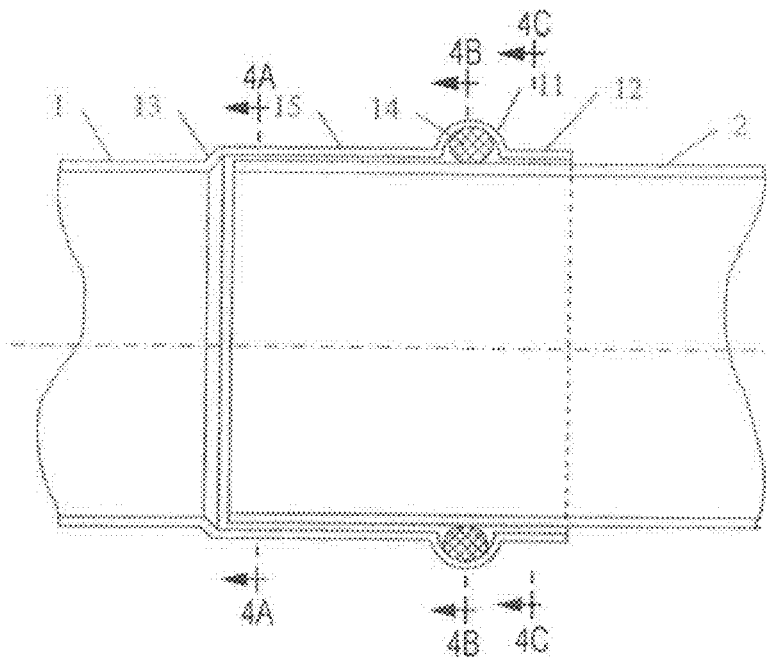
FIG. 4 is a section through a fitting on line A-A in FIG. 1.
Figure 4A:
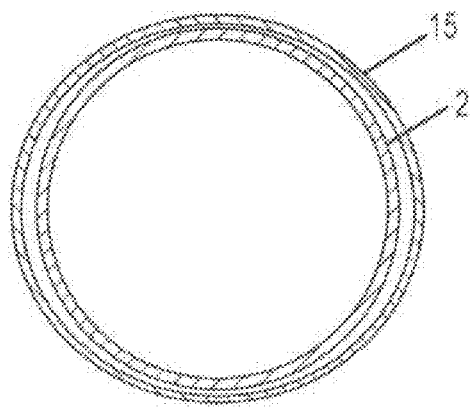
FIGS. 4A-4C are cross-sectional views of the fitting of FIG. 4 taken along lines A-A, B-B and C-C, respectively.
Figure 4B:
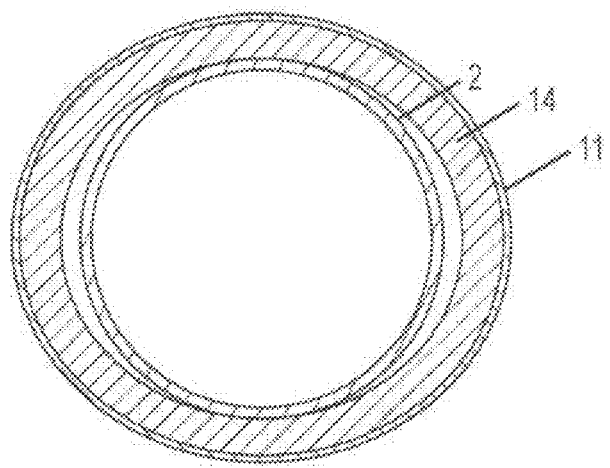
Figure 4C:
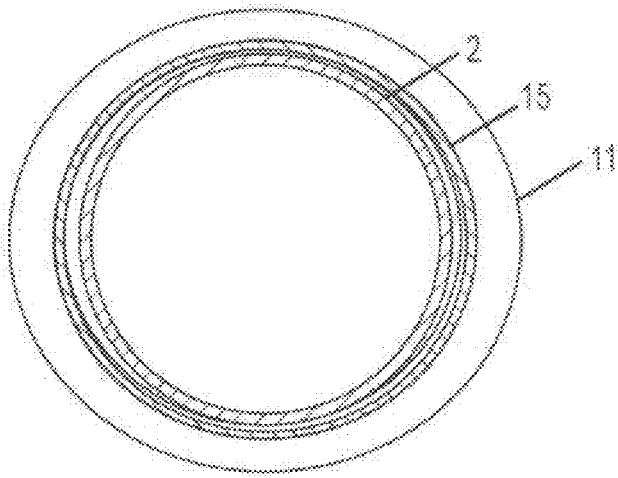
Figure 5:
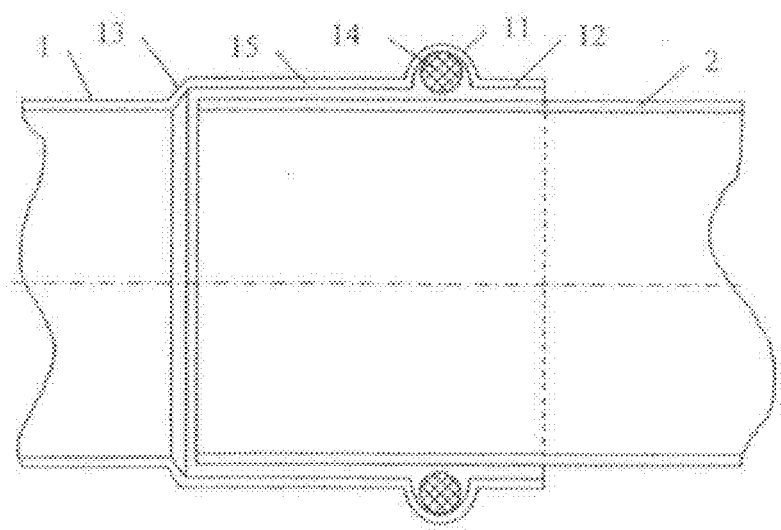
FIG. 5 is a section through a lining on line B-B in FIG. 3

The connecting arrangement for connecting lengths of pipe or tube by compression which has been selected as an exemplary embodiment in FIGS. 1 to 4 and 4A-4C comprises a fitting 1, into each of the two sides of which a length of pipe or tube 2 is slid. The fitting 1 is substantially in the form of a hollow cylinder. It is made of copper. It is also possible to employ other materials, for example special steel, copper, gunmetal or the like. Provided at each of the two ends of the fitting 1 is a ridge 11 which opens into a collar 12 in the direction of the respective free end. The ridge 11 extends radially around the fitting 1 and has a substantially semi-circular hollow cross-section. Here the ridge 11 is constructed at a constant depth relative to the fitting wall. Provided in the ridge 11 is a sealing element 14 in the form of an O-ring. Running round on the outside, there is provided in the centre of the tilting 1, between the two ridges 11, a notch 13 which produces a reduction in diameter in the internal contour of the fitting 1. The notch 13 divides the fitting 1 into two connecting sockets 15 and acts as an abutment for the lengths of pipe or tube 2 which are slid into the fitting 1 on both sides.

In the exemplary embodiment in FIG. 1, the internal contour of the fitting 1 is oval in form, which means that between the lengths of pipe or tube 2 that are introduced and the internal contour of the fitting 1 two diametrically arranged gaps 3 are formed with the sealing element 14 arranged in the ridge 11. Other non-circular cross-sections for the internal contour are possible as alternatives (see FIGS. 2 and 3). The external diameter of the lengths of pipe or tube 2 that are introduced is in this case smaller than the smallest internal dimension of the fitting 1. In the ridge 11, the sealing element 14 bears against it under pre-tension and in so doing assumes the non-round shape of the latter, which means that the gaps 3 also extend over the region between the sealing element 14 and the length of pipe or tube 2. In a modification of the exemplary embodiment, the non-round region of the fitting 1 in the case of a non-round ridge 11 may also be provided merely on one side of the ridge 11 or on both sides of the ridge 11. The provision of a non-round region on both sides or only on one side of the ridge 11, without the ridge 11 itself being of a non-round configuration, is also possible. The non-round region may in this case have a very small axial extent or else a great axial extent. The non-roundness advantageously extends over half the compressing region of the compressing jaw that is used for producing the compression connection. The non-round regions respectively extend parallel to the ridge 11, so that the radial distance of the ends of the non-round regions that are facing towards and away from the ridge are at a constant distance from the ridge 11 (so-called equidistance). Only by the reduction in circumference in the course of the compression by means of a compressing tool is the cross-section of the internal contour of the fitting 1 pressed against the external contour of the lengths of pipe or tube 2, as a result of which the gaps 3 are closed. In the course of this the sealing elements 14 are pressed against the lengths of pipe or tube 2 around their entire circumference by the connecting socket 15 and the collar 11 with a large amount of elastic deformation, by which means a sealed connection is obtained. Because of the irreversibility of the compression process, the compression connection which is made is suitable even for high pressures.

The symmetrically non-round shape of the internal contour of the fitting 1 gives the lengths of pipe or tube 2 centralised guidance when they are inserted in the connecting sockets 15 of the fitting 1, without imposing any restrictions on the gaps 3 which are formed as far as their function is concerned. It is also not possible for the pipe or tube 2 to slip out of the connecting socket 15 of the fitting 1 inadvertently prior to the compression.

Figure 6:
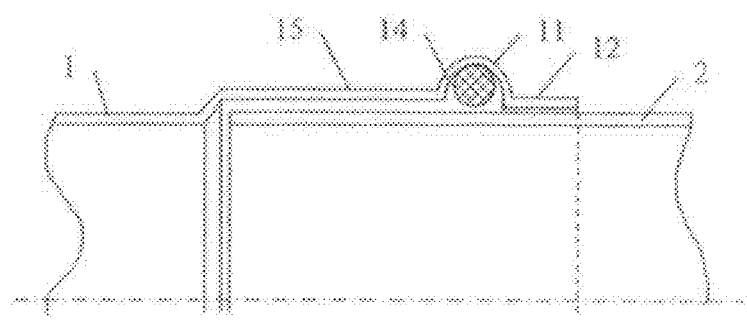
FIG. 6 is a view of the fitting of FIG. 5 with a reduced collar diameter.
Figure 7:
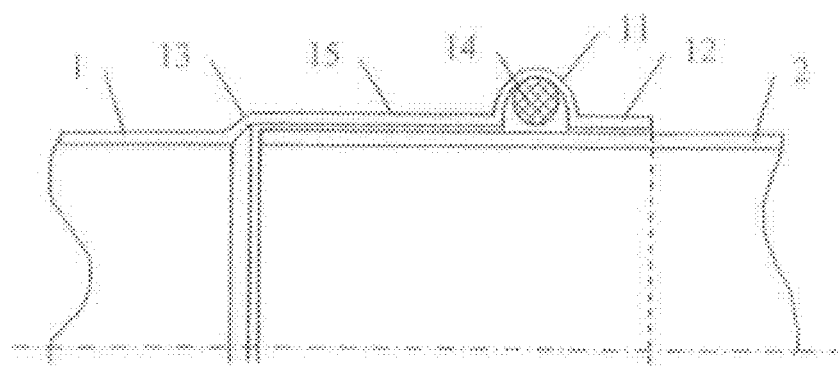
FIG. 7 is a view of the lining of FIG. 5 with a reduced internal-contour diameter but with the ridge unchanged.
Figure 8:
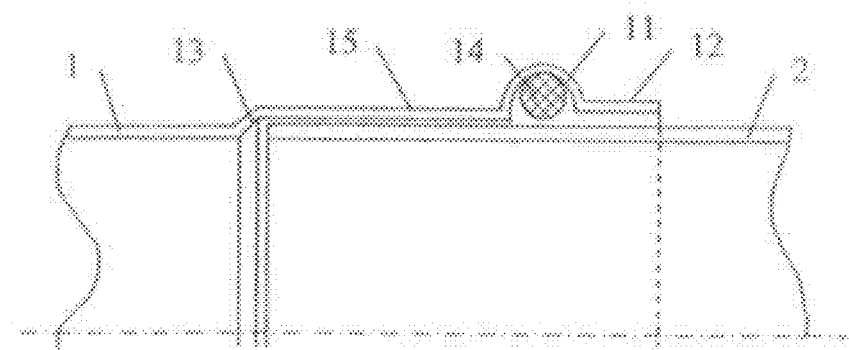
FIG. 8 is a view of the fitting of FIG. 7 with an enlarged collar inside diameter.
Figure 9:
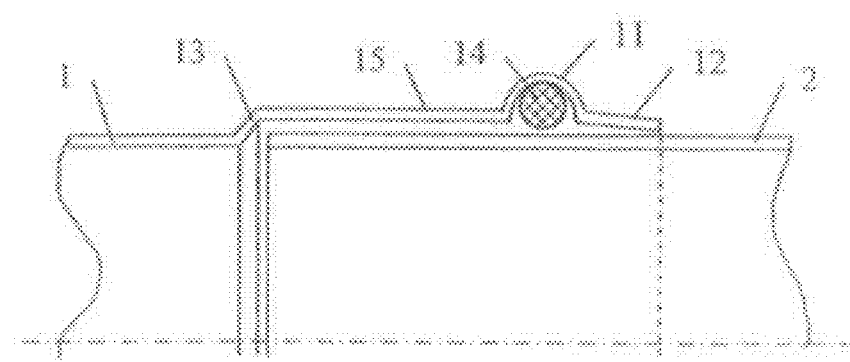
FIG. 9 is a view of the fitting of FIG. 5 with a collar which tapers in a conical shape.

In the exemplary embodiment shown in FIG. 6, the inside diameter of the collar 12 of the fitting 1 is of a reduced form. Further embodiments are shown in FIGS. 7 to 9. Because of the different forms of the connecting sockets 15 and collars 12, it is possible for the fitting to be matched to the medium to be carried in the optimum way, it being possible at the same time for maximum guidance to be obtained for the lengths of pipe or tube 2 within the fitting 1. In the exemplary embodiment shown in FIG. 9 for example, maximum fixing for the length of pipe or tube 2 is obtained within the fitting 1 by a collar 12 which tapers in a conical shape. At the same time, the pipe or tube 2 can be flexibly adjusted to external conditions, within the connecting socket 15, by means of the generously sized gap 3. In another embodiment, the collar 12 may also be omitted.

The proposed arrangement is a simple solution for producing a leakage point deliberately in the fitted state, so that the result of the pressure test is negative if the point of connection concerned in the pipe or tube has not been compressed, and the user can re-compress the connection which has not been compressed and repeat the pressure test. Because sub-regions of the internal contour of the fitting 1, and particularly of the sealing element 14 arranged in the ridge 11, rest against the length of pipe or tube 2 which is inserted, the pipe or tube 2 is prevented from inadvertently slipping out of the connecting arrangement before the compression. Also, the pipe or tube 2 is guided when being inserted into the fitting 1, which stops the sealing element 14 from being harmed or forced out of the ridge 11.

The proposed connecting arrangement can be applied to all current types of compression fitting. This gives the advantage that they can be used unaltered in a large number of the compression tools available on the market.

What is to be understood by the term "fitting" for the purposes of the invention are all connecting elements which can be connected to at least one pipe or tube end by means of a compression connection, including in particular valves. A fitting may be a relatively complicated item, the connection region of which is correspondingly slid onto a length of pipe or tube.

To produce the fitting, it is advantageous first to shape the desired non-round axial insertion region of the pipe or tube in a virtually cylindrical-circular form, but with a diameter which is about 1% to 10% larger than the diameter of the known compression fittings, and subsequently bring it into the desired non-round shape by forming. It is also conceivable for the non-round shape to be provided in a polygonal manner by machining on a relieving lathe.

The invention claimed is:

1. A connection system, comprising:
   a fitting comprising a hollow cylinder that tapers outward near one end to define a connecting socket at the end of the fitting, wherein the connector socket has a central axis and at least one radially outward directed ridge, in which a sealing element is provided;
   a pipe having an end with circular cross-section, wherein the end of the pipe is disposed inside the connecting socket of the fitting;
   wherein the connecting socket defines an internal surface that has a symmetrically non-round shape over the entire axial length of the connecting socket, with a smallest internal dimension and a greater internal dimension, wherein the external diameter of the end of pipe is smaller than the smallest internal dimension of said connecting socket to provide guidance for the end of the pipe for fitting by the smallest internal dimension and to form at least one axial gap that is axially aligned with the central axis; and
   said at least one axial gap extends over the entire connecting socket along its axial length between the internal contour of said connecting socket with a greater internal dimension and the end of pipe, and wherein the axial gap produces a deliberate leak point.

2. Connection system according to claim 1, wherein at least one outwardly curved ridge is arranged in a region of non-circular cross-section.

3. Connection system according to claim 1, wherein the non-circular cross-section is of substantially oval or polygonal form.

4. Connection system according to claim 1, wherein the non-circular cross-section is of a non-round shape which is symmetrically arranged around the circumference.

5. Connection system according to claim 1, wherein a collar is arranged at each of the ends of the fitting.

6. Connection system according to claim 1, wherein the internal contour of the fitting has at least one reduction in diameter against which at least one length of pipe can be brought into abutment.

7. Connection system according to claim 6, wherein a notch is made in the outside of the fitting, thereby forming the narrowing of diameter in the internal contour of the fitting.

8. Connection system according to claim 6, wherein the reduction in diameter is produced uniformly across the circumference.

9. Connection system according to claim 6, wherein the narrowing of diameter is produced at a point.

10. Connection system according to claim 1, wherein the fitting comprises plastically deformable material.

11. A connection arrangement, comprising:
    a fitting having a hollow body and a central axis, the hollow body having a connecting socket with a non-circular cross-section, an open end, and at least one outwardly curved ridge for arranging a sealing element;
    a pipe having a circular cross-section, wherein an end portion of the pipe is disposed within the connecting region of the fitting;
    wherein the connecting socket and at least one axial gap are axially aligned with the central axis and extends from the end of the pipe to the open end of the connecting region of the fitting, the axial gap passing between the hollow body and the pipe, the axial gap varying circumferentially; and a sealing element arranged inside the outwardly curved ridge; and wherein the axial gap produces a deliberate leak point.

12. Connection arrangement according to claim 11, wherein the gap has a radial dimension of 0.1 to 2 mm.

13. The connection system of claim 10, wherein the plastically deformable material comprises metal.

14. A connection system, comprising:

a connector comprising a hollow member that has a central axis and that defines a connecting socket having an open end, wherein the connecting socket has an internal surface having an internal radial groove formed therein, wherein a cross section of the internal surface of the connecting socket defines a symmetrical non-round shape having a larger cross sectional dimension and a smaller cross sectional dimension;

a sealing element disposed in the radial groove; and a pipe having an end with a circular cross section, wherein an outer diameter of the end of the pipe is smaller than the smaller cross dimension of the connecting socket, wherein the end of the pipe is disposed within the connecting socket of the connector such that an axial fluid gap exists between the outer diameter of the pipe and the portion of the internal surface of the connecting socket having the larger cross sectional dimension such that fluids may pass through the axial gap, wherein the axial fluid gap is axially aligned with the central axis and extends from the end of the pipe to the open end of the connecting socket, wherein the axial fluid an produces a deliberate leak point; and wherein the larger cross sectional dimension of the connecting socket is sized such that when the connector is circumferentially compressed about the pipe, the axial gap is closed and the sealing element is forced against the entire outer diameter or the pipe.

* * * * *